US007965415B2

United States Patent
Ohkawa (10) Patent No.: US 7,965,415 B2
(45) Date of Patent: Jun. 21, 2011

(54) IMAGE PROCESSING APPARATUS, IMAGE PROCESSING METHOD, AND COMPUTER PROGRAM PRODUCT

(75) Inventor: Satoshi Ohkawa, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 472 days.

(21) Appl. No.: 12/071,996

(22) Filed: Feb. 28, 2008

(65) Prior Publication Data

US 2008/0231894 A1  Sep. 25, 2008

(30) Foreign Application Priority Data

Mar. 22, 2007  (JP) ................. 2007-075146

(51) Int. Cl.
*G06F 15/00*  (2006.01)
*G03F 3/08*  (2006.01)
*G06K 9/62*  (2006.01)

(52) U.S. Cl. ............... 358/1.9; 382/209; 358/518
(58) Field of Classification Search .............. None
See application file for complete search history.

(56) References Cited

U.S. PATENT DOCUMENTS

| 7,336,399 B2* | 2/2008 | Nara ............... 358/3.26 |
| 2002/0140986 A1* | 10/2002 | Takayama ............ 358/402 |
| 2004/0114172 A1* | 6/2004 | Ohyama et al. ......... 358/1.13 |
| 2004/0234135 A1* | 11/2004 | Nomizu .............. 382/209 |
| 2004/0239995 A1* | 12/2004 | Sadowara ............ 358/2.1 |
| 2007/0030504 A1* | 2/2007 | Kawamoto et al. ....... 358/1.9 |

FOREIGN PATENT DOCUMENTS

| JP | 03-054972 | 3/1991 |
| JP | 06-054176 | 2/1994 |
| JP | 2915048 | 4/1999 |
| JP | 2001-223828 | 8/2001 |
| JP | 2001-251522 | 9/2001 |
| JP | 3285941 | 3/2002 |
| JP | 2003-283832 | 10/2003 |
| JP | 2004-104432 | 4/2004 |
| JP | 3647347 | 2/2005 |
| JP | 3741090 | 11/2005 |

* cited by examiner

*Primary Examiner* — Twyler L Haskins
*Assistant Examiner* — Barbara D Reinier
(74) *Attorney, Agent, or Firm* — Harness, Dickey & Pierce, P.L.C.

(57) ABSTRACT

An image reading unit acquires image data by reading a document, skin is detected from the image data, and skin processing is performed according to a detection result of detection of the skin. The image data is then corrected to have a predetermined data characteristic, and a second skin processing is performed on the image data based on a skin detection result. An image processing is conducted on the image data according to output characteristic, and then stored in a memory or a hard disk drive so as to be output as appropriate.

11 Claims, 4 Drawing Sheets

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority document 2007-075146 filed in Japan on Mar. 22, 2007.

BACKGROUND OF THE INVENTION

1. Field of the Invention

The present invention relates to an image processing apparatus, an image processing method, and a computer program product.

2. Description of the Related Art

Recent digital copy machines are also called digital multifunction peripheral (MFP) because they are able to exert copy function for copying a document and multiple functions such as scanner function, printer function, facsimile (FAX) function and the like. Such a digital MFP is used with a local area network (LAN) for a use of scanner function and printer function, and is often connected to an external network to exert facsimile function. Furthermore, output data from the scanner function and printer function is stored in a mass-storage device such as hard disk drive (HDD) disposed in the apparatus. Therefore, it is easy to transmit image data stored in the HDD via a network, or to store image data received from the external into the HDD.

The manner in which MFP is used in office is also diversified. For example, a small-sized MFP is often placed with personal computer (PC) to allow a user to use the functions of copy, facsimile, printer, and scanner in a convenient manner; a medium-sized MFP which is shared by a plurality of persons in a particular division or section to realize some productivity and use of sorting, punching, stapling and the like functions; and a large-sized MFP with various functions realizing high productivity and high quality used in a division that concentratedly conducts copy associated business in enterprise, or in a company specialized in copy associated business are known.

However, some functions can be shared by different classes (the small, the medium, and the large-sized MFPs), while other functions are exclusively necessary in a particular class. For example, in a large-sized MFP, it is necessary to conduct post processing on sheet after plotting image data or to conduct electronic filing concurrently with copying operation. Examples of the post processing include punching, stapling, and folding. On the other hand, in a small-sized MFP, improvement in internet FAX or PC-FAX and high quality image printing onto special sheet are demanded for personal use purpose.

Because importance of information value in business has been recognized, it is increasingly required to transmit information quickly, accurately, and reliably, in an easy-to-understand manner and in an effective manner. Speeding up and prevalence of communication technique, enlarged capacity, reduced cost, and reduced size of memory, and increased performance of PC are associated with provision of new functions for efficiently handling information with digital data, and provision and incorporation of such new functions are also demanded for MFPs which handle digital image data.

Data is output from an MFP to a sheet as is the case of copying, and transmitted as electronic data as is the case of scanner and FAX transmission, as described above. For transmitting electronic data, output formants can be changed depending on the use application. For example, in FAX transmission, monochrome binary image data format is used, while in a scanner transmission, color RGB image data is used.

As described above, an MFP outputs image data from various units having different output characteristic. In the case of output to paper, characteristic of a writing unit and in the case of scanner delivery, characteristic of a display on which the data is to be displayed are exemplified. In an MFP, a mass storage device such as HDD is provided. It is also possible to accumulate image data read by a scanner or image data from external in the storage device. And the accumulated image data may be re-outputted to a sheet or used for data communication via a FAX in a similar manner as the image data is accumulated.

A conventional MFP having a function as describe above is disclosed in Japanese Patent Application Laid-Open No. 2001-223828, Japanese Patent Application Laid-Open No. 2001-251522, and Japanese Patent Publication No. 3741090.

When information containing image data is processed, in particular, when image information is processed, data is temporarily stored in a storage device because data volume is large, and only data to be processed is read out from the storage device at the time of processing to execute intended processing. As a storage device, HDD is generally used. Although HDD has a large capacity, its capacity has limitation in accumulating data. For example, if an image of A3:600 dots per inch (dpi):RGB is stored in a storage unit, its image size becomes 200 megabytes or larger, which is too large to be stored in the HDD. For this reason, it is general to accumulate image data by compressing the image data at the time of accumulation.

As for a compression format, a lossy compression format such as Joint Photographic Experts Group (JPEG) may be used. However, size after JPEG compression varies depending on the imaged data. In particular, data compressibility is different between the case where image data with skin is compressed and the case where image data without skin is compressed. Therefore, when accumulated image data is large, capacity of HDD is used up. Furthermore, removing the skin in advance to reduce image size is inappropriate when the skin needs to be outputted with an image.

SUMMARY OF THE INVENTION

It is an object of the present invention to at least partially solve the problems in the conventional technology.

According to an aspect of the present invention, there is provided an image processing apparatus that includes an image reading unit that acquires image data by reading a document; a skin detecting unit that detects skin of the document; a first skin processing unit that conducts first skin processing based on a result of skin detection conducted by the skin detecting unit; an image correcting unit that conducts image correction on the image data to obtain corrected image data having predetermined data characteristic; a second skin processing unit that conducts second skin processing based on a result of skin detection conducted by the skin detecting unit; an image processing unit that conducts image processing on the image data so as to obtain processed image data having desired characteristic; a storage unit that stores therein any one of the corrected image data and the processed image data; and a data outputting unit that outputs the image data stored in the storage unit.

According to another aspect of the present invention, there is provided an image processing method that includes acquiring image data by reading a document; detecting skin of the document; conducting first skin processing based on a result obtained at the detecting; correcting the image data to obtain corrected image data having predetermined data characteristic; conducting second skin processing based on a result obtained at the detecting; conducting image processing on the image data so as to obtain processed image data having desired characteristic; storing any one of the corrected image data and the processed image data in a storing unit; and outputting the image data stored at the storing.

According to still another aspect of the present invention, there is provided a computer program product that stores therein a computer readable program codes that, when executed, causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained with reference to the accompanying drawings.

Figure 1:
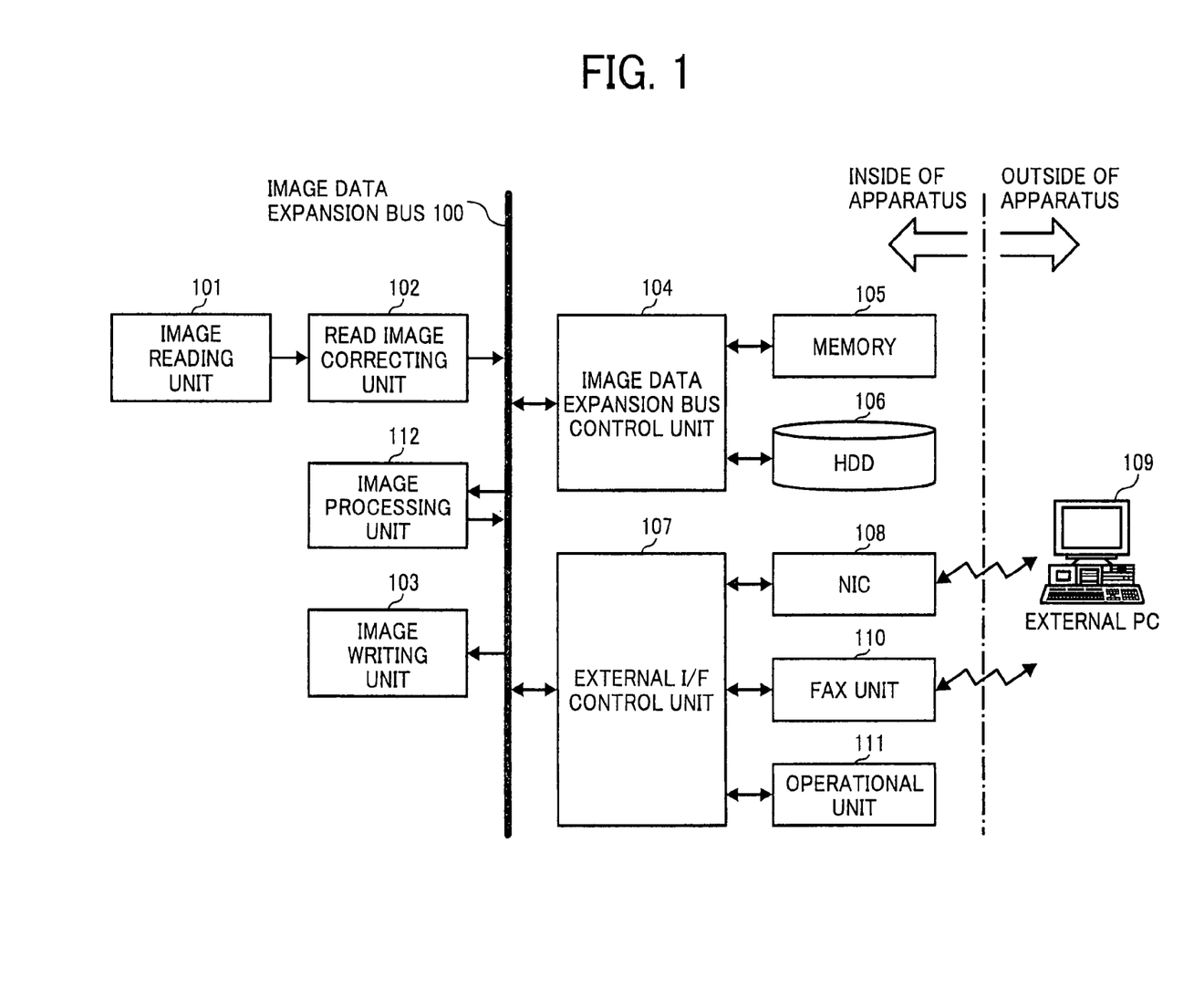
FIG. 1 is a block diagram of a digital multifunction peripheral (MFP) according to an embodiment of the present invention.
Figure 2:
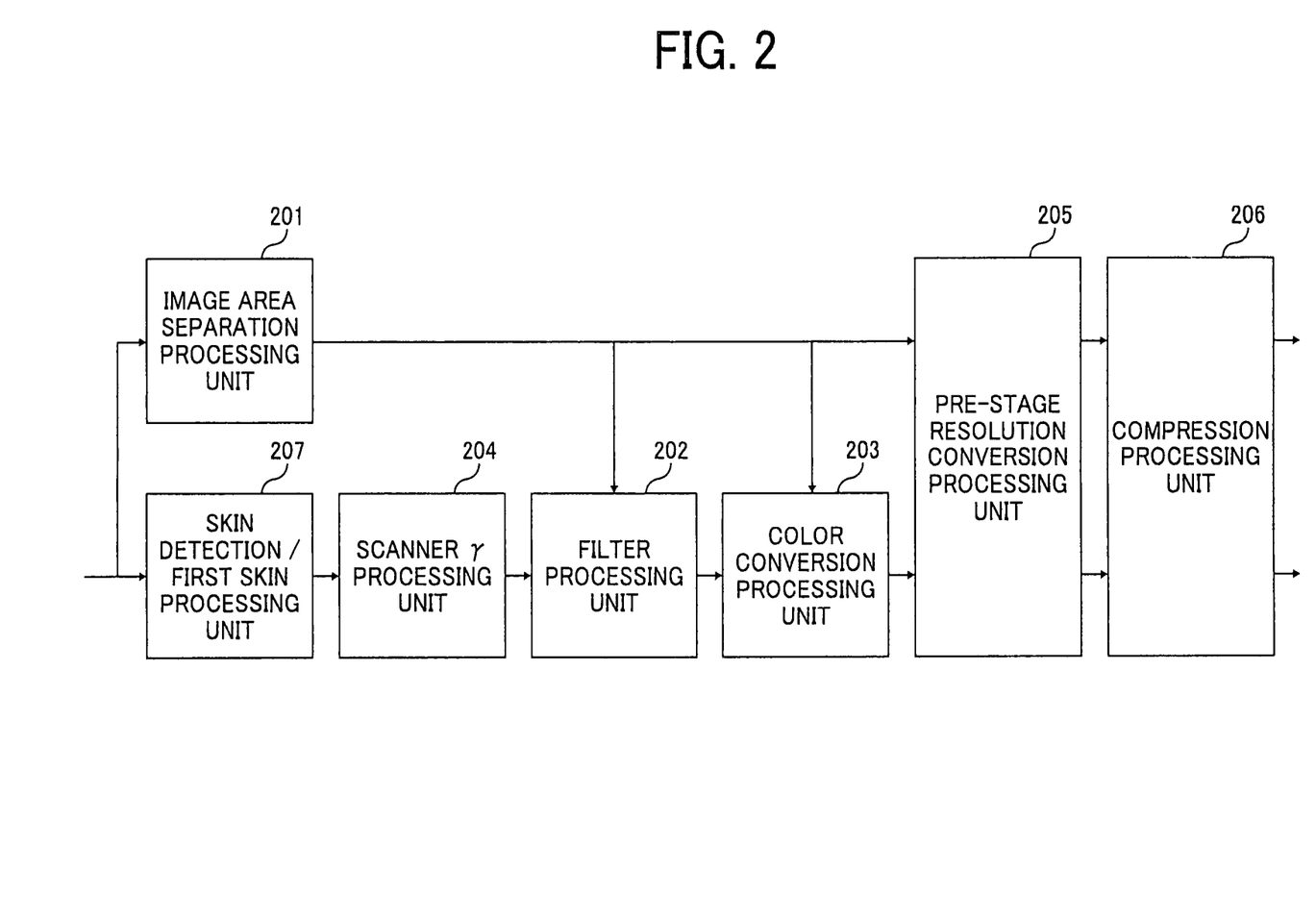
FIG. 2 is a block diagram of a read image correcting unit shown in FIG. 1.
Figure 3:
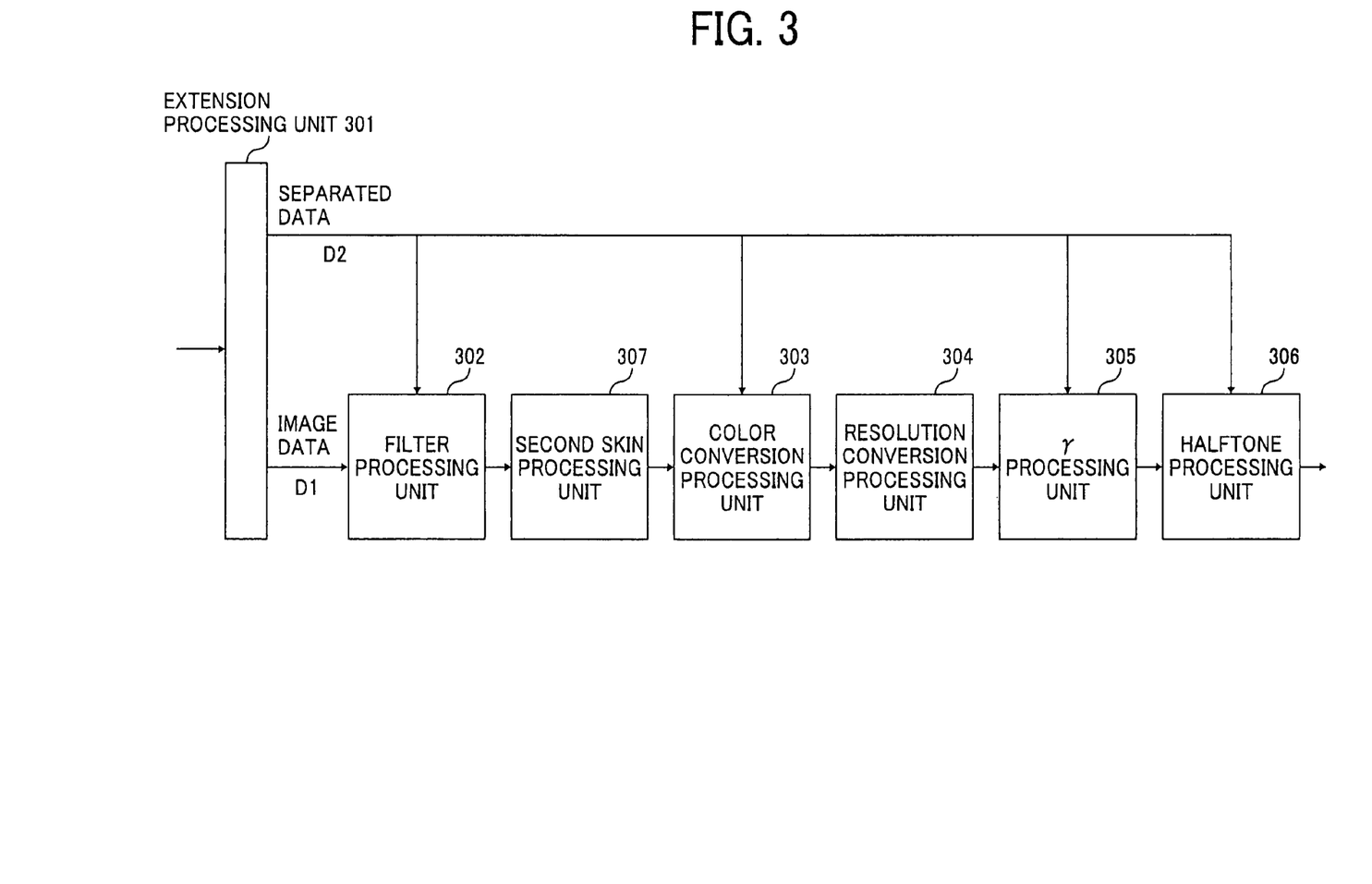
FIG. 3 is a block diagram of an image processing unit shown in FIG. 1.

In the present embodiment, image reading unit corresponds to an image reading unit 101, skin detecting unit corresponds to a skin detection/first skin processing unit 207, first skin processing unit corresponds to the skin detection/first skin processing unit 207, image correcting unit corresponds to a read image correcting unit 102, second skin processing unit corresponds to a second skin processing unit 307, image processing unit corresponds to an image processing unit 112, storage unit corresponds to a memory 105 and HDD 106, data outputting unit corresponds to an image writing unit 103, accumulation determining unit, accumulation mode selecting unit and plural output setting unit correspond to the image processing unit 112, and external controlling unit corresponds to an external interface (I/F) control unit 107.

FIG. 1 is a block diagram of a digital MFP according to an embodiment of the present invention. The digital MFP according to the embodiment includes an image data expansion bus control unit 104 connected to an image data expansion bus 100, the external I/F control unit 107, the read image correcting unit 102, the image processing unit 112 and the image writing unit 103. Furthermore, to the image data expansion bus control unit 104, the memory 105 and a hard disk drive (HDD) 106 are connected, and to the external I/F control unit 107, a network interface card (NIC) 108, a facsimile (FAX) unit 110, and an operational unit 111 are connected. Further, the NIC 108 is able to communicate with an external personal computer (PC) 109, and the FAX unit 110 is also able to communicate with an external FAX machine. The read image correcting unit 102 is connected to the image reading unit 101 and conducts necessary correction on a read out image.

The image reading unit 101 includes a line sensor (not shown) formed of charge coupled device (CCD) photoelectric conversion elements, an analog-to-digital (A/D) converter (not shown), and a driving circuit (not shown) that drives these elements. Also the image reading unit 101 has an optical unit (not shown) composed of an optical source and a mirror, and by moving the optical unit, an image is optically read out from a document set at a reading position (for example, on an exposure glass) or from a document passing a reading position in the image reading unit 101. Moving speed of the optical unit is variable depending on the variable magnification at the time of reading, and magnification in the sub scanning direction may be varied by making the speed slow at the time of enlargement or fast at the time of reduction. At this time, in the case of a color CCD, image data of 8 bit (other than 8 bit is also possible) for each of colors red, green, blue (RGB) which is an electric signal is sent to the read image correcting unit 102 after photoelectric conversion and amplification for each color separation light R, G, and B. A document to be read is set at a reading position of the image reading unit 101 by a user, or set at the reading position by an automatic document feeder (ADF) which automatically feeds documents on a document base one by one. Alternatively, a document merely passes the reading position by the ADF. The speed at which a document passes the reading position is also variable depending on the variable magnification, and magnification in the sub scanning direction is varied by making the moving speed slow at the time of enlargement and fast at the time of reduction. It is assumed here that image data read by the image reading unit 101 is 8 bit for each color; however, the bit number is not thus limited.

The read image data is sent to the read image correcting unit 102. FIG. 2 is a block diagram of the read image correcting unit 102. The read image correcting unit 102 includes an image area separation processing unit 201, a filter processing unit 202, a color conversion processing unit 203, a scanner γ processing unit 204, a pre-stage resolution conversion processing unit 205, a compression processing unit 206, and the skin detection/first skin processing unit 207.

The image area separation processing unit 201 extracts an area which is characteristic of a particular document. Specifically, the image area separation processing unit 201 conducts extraction of halftone dot part formed by general printing, extraction of edge part of a character or the like, determination of whether the image data is chromatic or achromatic, and determination whether a background image is white. Image data inputted to the image processing unit 112 is sent to the skin detection/first skin processing unit 207. The skin detection/first skin processing unit 207 detects skin density of read document with reference to a certain uniform region of read image data. Based on the detection result, data of skin part is removed if necessary from the image data inputted to the read image correcting unit 102. When the data of skin part is removed, image data is corrected so that the background is white.

Considering the case where a document such as newspaper is copied, there is data when output in its current condition is desired. However, considering the readability of an image printed on the newspaper, the printed information becomes clearer when the background of the newspaper is white. In such a case, skin is whitened by using a skin processing function. A result of skin detection is stored as necessary. Whitening processing is executed when a user sets the skin processing "ON" in the operational unit 111. The whitening processing is not usually executed, but is conducted by choice of a user. If execution of the whitening processing is not selectable, it is impossible to print the background even when printing of background of newspaper in the above manner is desired. It is important to make such a function selectable between ON and OFF.

Output data from the skin detection/first skin processing unit 207 is sent to the scanner γ processing unit 204. The scanner γ processing unit 204 conducts image γ conversion from γ characteristic of the image reading unit 101 to the characteristic for output. Image data output from the scanner γ processing unit 204 is transmitted to the filter processing unit 202. Filter processing in the filter processing unit 202 is for converting spatial frequency of image data. Using a result determined by the image area separation processing unit 201, filter processing which is characteristic of a particular extracted part is conducted. For example, in the area that is detected as a halftone dot part, smoothing processing for smoothing the halftone dots is executed. When the background of edge part is white, edge emphasizing processing for improving modulation transfer function (MTF) characteristic is conducted on presumption that the area is a character part.

The image data processed in the filter processing unit 202 in the above manner is inputted to the color conversion processing unit 203. The color conversion processing unit 203 has a function of conducting color conversion processing which is suited for output characteristic. For example, in image formation including temporary accumulation of image data, RGB conversion to universal RGB data or to predetermined space is conducted.

Then the pre-stage resolution conversion processing unit 205 converts resolution of image data to the resolution suited for the subsequent operation, and outputs the image data with converted resolution. For example, when reading resolution is 600 dots per inch (dpi) in the main scanning direction and 300 dpi in the sub scanning direction, and an image of 300× 300 dpi is required to be outputted, the image is outputted after it is processed to have a desired resolution by the pre-stage resolution conversion processing unit 205. At this time, magnification is varied by operation processing by three-dimensional convolution or the like. Then the compression processing unit 206 compresses image data output from color conversion processing and data output from the image area separation processing unit 201. At this time, as for the image data, lossy compression format such as Joint Photographic Experts Group (JPEG) can be used. However, as for output data of the image area separation processing unit 201, it is necessary to use lossless compression format because data depends on the position of pixel. The output data is temporarily accumulated also in the HDD 106 via the memory 105. Since different compression formats are used at this time, each data (image data and image area separated data) may be separately compressed and accumulated; however, it is necessary to control and mange the dependence of the data, and to handle the data together in subsequent processing.

As for the operation of the HDD 106, it is requested to send image data in constant timing to the image writing unit 103 such as a plotter during continuous reading by the image reading unit 101. In actual, however, such situation often occurs that image data can be inputted but cannot be outputted during preparation for output or the like, so that the limited capacity of the memory 105 is exceeded. No problem arises when the capacity of the memory 105 is sufficient, however, increasing the memory capacity will simply result in cost up of hardware. For this reason, the HDD 106 is used for temporarily storing in the mass-storage device HDD 106 and solving the overage of memory capacity.

Data is transmitted from the memory 105 to the image processing unit 112, and the image processing unit 112 converts characteristic of accumulated image data into image writing characteristic for conducting data output to a sheet. For example, an image is converted into CMYK image in the case of a color writing device.

FIG. 3 is a block diagram of the image processing unit 112. It is noted that input data includes image data D1 and data D2 representing result of image area separation processing. An extension processing unit 301 extends the image data D1 and the data D2 compressed in the compression processing unit 206. Then, a filter processing unit 302 executes filter processing on the image data to adapt to MTF characteristic of the image writing unit 103. In the filter processing within the read image correcting unit 102, characteristic is corrected in advance to a predetermined characteristic for accumulation in the memory 105, the HDD 106 or the like. However, in the present filter processing unit 302, the predetermined accumulation image characteristic is converted to image characteristic for the image writing unit 103. Also, characteristic conversion is conducted using separated data which is characteristic of the document. After the filter processing unit 302 executes the filter processing, the image data D1 is inputted to the second skin processing unit 307.

Processing function of the second skin processing unit 307 is equivalent to that of the skin detection/first skin processing unit 207. In the second skin processing unit 307, when it is determined that skin processing is required, skin correction is conducted using a result from the skin detection/first skin processing unit 207 and stored in advance. The image data having subjected to skin processing as necessary is sent to a color conversion processing unit 303. Also in the skin detection/first skin processing unit 207, it is possible to assume black character in the case of achromatic based on separated data which is a result of the image area separation processing unit 201, and black monochromic processing may be conducted based on that assumption in conducting CMYK conversion. The image signal processed in the color conversion processing unit 303 is subjected to arbitrary magnification variation processing in a resolution conversion processing unit 304 and then sent to a γ processing unit 305 where γ conversion from predetermined accumulation image characteristic to output characteristic is conducted. Using data having processed in the γ processing unit 305, a halftone processing unit 306 executes tone processing for adapting to characteristic of the image writing unit 103. Examples of the tone processing include dither processing and error diffusion processing. The halftone processing unit 306 also executes conversion of depth (bit number) of tone of the image writing unit 103. For example, in the case of output of 1 bit, a signal of inputted 8 bit is converted to a signal of 1 bit while dither processing is conducted.

The signal processed in the image processing unit 112 is temporarily inputted again to the image writing unit 103 via the memory 105, the HDD 106 and the like. Upon reception of digital image data with CMYK, the image writing unit 103 outputs the received image data to a transfer sheet by electrophotographic process using laser beam.

Here, when data is transferred from the image reading unit 101 to the read image correcting unit 102, from the read image correcting unit 102 to the image processing unit 112, and from the image processing unit 112 to the image writing unit 103, input and output of data is conducted via the image data expansion bus 100. Depending on the timing that controls the units, preparation for output is not always completed depending on the condition of engine plotter, even when the image writing unit 103 tries to output image data having processed by the image processing unit 112. In such a case, the image data is temporarily held in the memory 105 or in the HDD 106. Since the image data expansion bus 100 is shared by different modules, it is under the control of the image data expansion bus control unit 104 that controls input and output of image data. The memory 105, such as random access memory (RAM) which is a storage medium, or the HDD 106 is also connected to the image data expansion bus control unit 104.

When image data read by the line scanner in the image reading unit 101 is sent to the image processing unit 112, image data is held in the memory 105 in correspondence with the sending speed and the process at that time. This is for example, the case where reading operation of the image reading unit 101 and image processing operation of the image processing unit 112 are conducted in parallel. The term "parallel" in this case means that reading operation and image processing operation are executed as processing which are not directly associated. As described above, when different processing is executed in the image reading unit 101 and in the image processing unit 112, image data is held in the memory 105. Thereafter, image data is stored in the HDD 106 as necessary, and used, for example, for recycle of the data.

The process as described above is intended exclusively for output to a sheet, and there is also the case that image data obtained by reading a document is accumulated. In the following, explanation will be given for the process of accumulating image data in a device independent format for recycling the image data.

Figure 4:
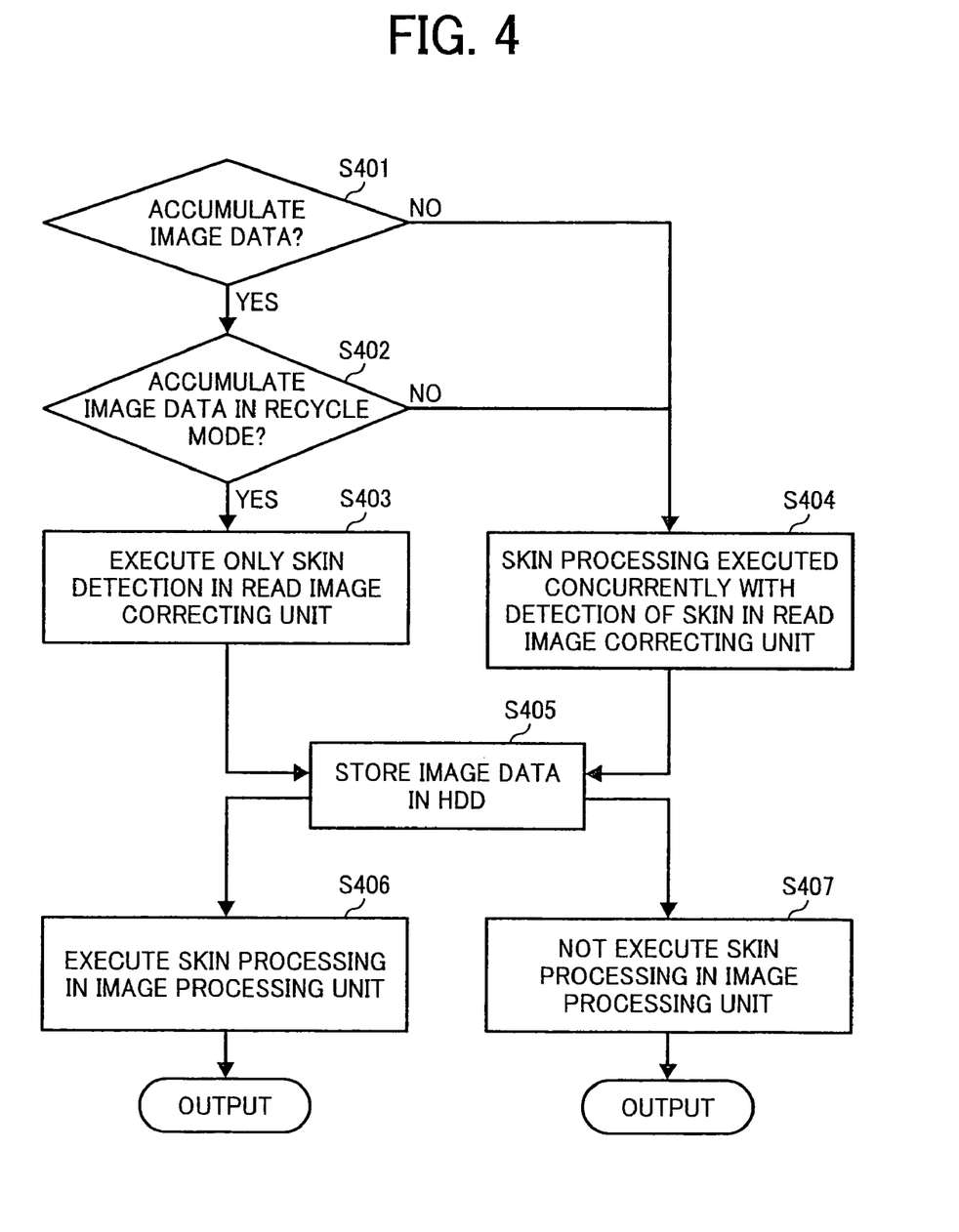
FIG. 4 is a flowchart of processing for accumulating image data in a device independent format, and for outputting accumulated image data to a sheet.

FIG. 4 is a flowchart of processing for accumulating image data in a device independent format, and processing for outputting accumulated image data to a sheet.

After a document is read in the image reading unit 101 such as a scanner, and formed as image data, the image data is converted to image data in a device independent format by the image processing unit 112. Then it is determined whether the image data is to be accumulated (step S401), and when it is accumulated (Yes at step S401), whether it is to be accumulated as recycle mode is determined (step S402). When it is accumulated in recycle mode (Yes at step S401), only skin detection is executed in the read image correcting unit 102 (step S403), and image data is accumulated in the HDD 106 (step S405). On the other hand, when image data is not accumulated (No at step S401), and when the image data is not to be accumulated in recycle mode (No at step S402), the read image correcting unit 102 conducts skin processing concurrently with detection of skin (step S404), and accumulates the image data in the HDD 106 (step S405).

As the characteristic of image data in a device independent format, for example, sYCC which is standard color space, Adobe RGB space as color space, RGB space that is commonly determined in advance as equipment or the like is used as color space. Also, space frequency or the like is designated, and conversion is conducted by the image processing unit 112 so that such image characteristic is realized. Thereafter, image data is sent to the HDD 106 via the image data expansion bus 100 and accumulated.

When accumulated image data is outputted on a sheet, image data accumulated in the HDD 106 is sent to the image processing unit 112 via the memory 105 and the image data expansion bus control unit 104. At this time, in the image processing unit 112, image is processed and converted from characteristic of the device independent format to characteristic suited for the image writing unit 103 because data output to a sheet is intended. Thereafter, the image data is outputted to a sheet by the image writing unit 103 after the image data is temporarily intervened by the memory 105. At this time, since the image data that is subjected to image processing in recycle mode and accumulated is not image data having subjected to skin processing, the image data is subjected to skin processing by the image processing unit 112 (step S406) and sent to the image writing unit 103, or sent to the image writing unit 103 without being subjected to skin processing by the image processing unit 112 when the mode is not the recycle mode (step S407).

In step S401, when it is determined that image data is not to be accumulated in the memory 105 or the HDD 106, and when the image data is accumulated in a recycle mode, only skin detection is conducted at step S403. The skin detection is executed by the skin detection/first skin processing unit 207. In this process, a user selects whether read image data is to be accumulated in the HDD 106 or the like on the operational unit 111 on which an operator is allowed to make settings, before reading the image. When the selected result indicates not accumulating image data, and the image data read by the image reading unit 101 is processed by the read image correcting unit 102, skin processing is also conducted if necessary by the skin detection/first skin processing unit 207. After temporal storage in the memory 105 or the like, the image data is subjected to image processing for output in the image processing unit 112, and the image data is outputted. At this time, skin processing is not conducted in the second skin processing unit 307 in the image processing unit 112. This is because skin processing is already conducted by the skin detection/first skin processing unit 207. As described above, by making image data of the entire skin part of the document white (255) by conducting skin processing preliminarily, it is possible to obtain image data of compression effect of image data inputted to the compression processing unit 206. This results in improvement in compressibility by the compression processing unit 206, and reduction of the capacity of memory used in the memory 105.

When it is determined whether image data is accumulated in a recycle mode at step S402, in re-outputting accumulated image data, selection is made between a reuse mode that allows output only in the image quality settings set at the time of accumulation, and a recycle mode that allows selection of image quality setting for output for accumulated image data at the time of later outputting. When data accumulation is conducted, skin processing is conducted in the skin detection/first skin processing unit 207 in the reuse mode, while skin processing is conducted in the second skin processing unit 307 in the recycle mode.

In the process, before reading image data, a user selects whether the read image data is to be accumulated in the HDD 106 or the like through the operational unit 111 on which the user can make settings. At this time, when the user selects accumulation, the user also selects whether the image data is accumulated in the reuse mode that allows only reuse, or in the recycle mode that accumulates data in a recyclable condition. The reuse mode means that the image data is used only in the mode set at the time of reading. Specifically, although image data is accumulated, that image data is re-output in such a set image format of FAX output, image quality specialized for character document, and predetermined output resolution as set at the time of reading. On the other hand, the recycle mode means accumulation mode in which the way of use of accumulated image data after accumulation can be changed as appropriate, and output in a format other than the output format is allowed even when output is made concurrently with the current accumulation. Specifically, a read document is outputted in full-color copy format, while it is accumulated concurrently in a recycle mode, and thereafter, the mode of the accumulated image can be set at any modes including image quality mode, color mode or the like from the output terminal. For example, this mode enables a user to designate desired resolution at the time of transmission of image data to a PC via a network or the like, and to transmit it by monochromic binary.

Now, the case where a user sets a reuse mode is considered. When skin processing is set "ON" in the reuse mode, the image data read by the image reading unit 101 is subjected to skin removing processing based on a result of detection of the skin of a document by the skin detection/first skin processing unit 207 in the read image correcting unit 102. Image data that is subjected to skin removal processing in the above manner is then subjected to processing designated in various processing units, the scanner γ processing unit 204, the filter processing unit 202, the color conversion processing unit 203, and the compression processing unit 206 in this order, and the image data is accumulated in the HDD 106 in a compressed state. Since the image data is accumulated in the reuse mode, it is outputted in an output form of image quality set at the time of accumulation. For example, when setting is made at the time of reading so that data is to be outputted as electronic data for an image having resolution of 300 dpi and gray scale of 8 bit compressed by JPEG, an image processing is performed in the image processing unit 112 so that such an image is achieved. However, when data is accumulated as data for which the setting is made, the image data can be outputted only with such setting by an operator who outputs the accumulated image data in later days.

On the other hand, when a user designates the recycle mode, operation from the reading to accumulation is different from that of the reuse mode, and the accumulated image may be subjected to various processing. Accordingly, even when skin processing is set "ON", image data that is read by the image reading unit 101 is subjected to detection of skin of document in the skin detection/first skin processing unit 207 in the read image correcting unit 102, and the image data is accumulated into a mass-storage device such as the HDD 106 together with the detection result. However, in the skin detection/first skin processing unit 207, skin removal processing is not executed. The image data on which skin removal processing is not executed is then subjected to image processing such as scanner γ processing, filter processing, color conversion processing and the like, compressed by the compression processing unit 206, and stored in a storage device such as the HDD 106.

When the stored image data is outputted, it may be outputted in output format set at the time of reading, or may be outputted in other output format. At this time, when the output format involves execution of skin processing, the accumulated image data is subjected to skin processing by the second skin processing unit 307 in the image processing unit 112 that processes accumulated image data to output format. In parallel with this, skin processing is conducted based on the skin detection result of a document by the skin detection/first skin processing unit 207, accumulated and stored together in accumulation of image data. Unlike the reuse mode, the recycle mode enables change in format depending on the output application, and enables selection between permission/exhibition of reflection of image data in ON/OFF of skin processing.

With the above modes, it is possible to increase compressibility in re-outputting accumulated image data, by preliminarily subjecting the image data to image processing suited for the output format when the output format is predetermined, particularly by subjecting the image data to skin removal processing and to eventually prevent accumulation capacity of HDD or the like from being used up. On the other hand, when the output format in re-outputting is determined later, it is possible to increase the user-selectable options of function in re-outputting by changing a format in the skin processing to the format for the image processing unit 112.

The mode can be selected in other operation as well as in data accumulation. For example, the mode can be selected when performing output operation conducted together with accumulation, and a image processing is conducted in accordance with the selected accumulation mode.

When plural image outputs are designated concurrently, the processing is conducted in the following manner. In this processing, before reading a document to be outputted in the image reading unit 101, output mode is selected in the operational unit 111 (including input from PC). Now considered is the case where there are three outputs: the first output is full color copy at same magnification, the second output is binary FAX image output at 200×100 dpi, and the third output is RGB image output at 300 dpi for output to PC. At this time, it is assumed that skin processing is ON in the first and the second outputs, and skin processing is OFF in the third output. In this output format, an image that is read in the image reading unit 101 is converted into universal RGB image data by the read image correcting unit 102. The read image correcting unit 102 conducts only skin detection without conducting skin removal processing, and temporarily stores the image data together with the detection result in the HDD 106.

Image processing is sequentially conducted in the image processing unit 112 so that designated output data is obtained. Since there are three outputs in the above example, for the same image data, data is sent to the image processing unit 112 three times, and image processing is executed to provide the respective output data. For example, in the first output, image data that is extended in the extension processing unit 301 is subjected to filter processing in the filter processing unit 302 so as to be suited for output characteristic, and then subjected to skin processing in the second skin processing unit 307 because skin processing is selected to "ON". In the color conversion processing unit 303, RGB image data is converted into CMYK image data so as to achieve sheet output format, and further, γ processing, halftone processing and the like appropriate processing is conducted before output. Then similar processing is performed for the second and the third outputs before they are outputted. At this time, when there are a plurality of outputs, designation of ON/OFF of skin processing may change in each case. For allowing this, the skin processing is conducted in the second skin processing unit 307 to increase the function of output for image data.

According to the embodiment, the external I/F control unit 107 is provided as shown in FIG. 1, and image data can be transmitted/received to/from a variety of external image processing devices of similar types via the NIC 108. For example, now considered is the case that there are an image processing device A and an image processing device B, and data is read by the image processing device A, converted into universal RGB data in the read image correcting unit 102 and image data is stored in the HDD 106. In such a case, when image data is not outputted from the image processing device A, but image data is outputted to the image writing unit 103 of the image processing device B, image data that is accumulated in the image processing device A is transmitted to the image processing device B, and subjected to image processing in the image processing unit 112 of the image processing device B.

Information required in the image processing unit 112 of the image processing device B, for example, skin detection result for conducting skin removal processing by the second skin processing unit 307 is also sent together with the transmitted image data for conducting the processing based on the result.

As described above, by transmitting image data together with information for output, it is possible to output image data at other devices via a network.

Furthermore, when a plurality of processing is conducted, or when image accumulation or image output is conducted while a plurality of devices make transmission/reception between the devices, skin processing is conducted in the second skin processing unit. However, skin processing may be conducted by the first skin processing unit when read image data is connectedly outputted via a network by other device. As such a case, concurrent output operations are performed to the following two apparatuses by an image processing apparatus for reading a document to be outputted. One of the two apparatuses is an image processing device A which is a reading unit. The other one is an image processing device B which is capable of data transmission/reception with the image processing device A and having a similar configuration to that of the image processing device A. In this case, there are two output devices, and the same output result is required in the image processing devices A and B. In the image processing device A, image data that is read by a reading unit is processed in the read image correcting unit 102 to generate universal RGB image data. This is because plotter characteristics are different for the same kinds of devices, and the processing for the plotter characteristics are executed by respective processing unit, and at first, unified image data conversion is conducted as a pre processing. At this time, when skin removal is ON, skin processing by the skin detection/first skin processing unit 207 is conducted in advance in the read image correcting unit 102. This is because the skin depends on image data read from a document, but does not depend on characteristic of each device. Furthermore, by conducting skin processing first, it is possible to increase compressibility of image data, and to reduce the data volume. This allows transfer of data transmission with reduced volume.

Each processing in the embodiment can be programmed, and executed by a central processing unit (CPU) of control circuit in the digital MFP.

As described above, image data read in the image reading unit 101 is subjected to processing, and temporarily stored in the memory 105 or the HDD 106, and the stored data is outputted after being subjected to image processing. Therefore, it is possible to conduct skin removal before and after data storage, and either or both of skin processing before data storage and skin processing after data storage can be selected. Accordingly, it is possible to separate the processing case by case in such a manner that skin removal is conducted first for the purpose of reducing memory capacity of the memory 105 or the HDD 106, and skin removal is conducted in a subsequent part of the storage unit for the purpose of increasing of recyclability of image after accumulation. As a result, capacity of the storage unit will not be used up, and selection of removing the skin or outputting skin is enabled.

According to an aspect of the present invention, corrected imaged data or processed image data is stored in a storage unit, and stored image data is outputted. Therefore, capacity of the storage unit will not be used up, and it is possible to select whether skin is removed or outputted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    an image reading unit that acquires image data by reading a document, the image data including data of a skin part of the document, where the skin part relates to a background of the document;
    a skin detecting unit that detects the skin part of the document;
    a first skin processing unit that conducts first skin processing to remove the data of the skin part of the document from the image data based on a result of skin detection conducted by the skin detecting unit;
    an image correcting unit that conducts image correction on the image data to obtain corrected image data having predetermined data characteristic;
    a second skin processing unit that conducts second skin processing to remove the data of the skin part of the document from the image data based on a result of skin detection conducted by the skin detecting unit;
    an image processing unit that conducts image processing on the image data so as to obtain processed image data having desired characteristic;
    a storage unit that stores therein any one of the corrected image data and the processed image data; and
    a data outputting unit that outputs the image data stored in the storage unit
    an accumulation determining unit that determines whether image data is to be accumulated in the storage unit,
    a mode setting unit that sets any one of a reuse mode that permits output only in image quality set at the time of accumulation and a recycle mode that allows selection of image quality for accumulated image data when image data accumulated in the storage unit is re-outputted,
    wherein when it is determined by the accumulation determining unit that data is not to be accumulated, the image correcting unit causes the first skin processing unit to conduct the first skin processing, and
    wherein when it is determined by the accumulation determining unit that data is to be accumulated, the first skin processing is conducted by the first skin processing unit if the reuse mode is set, and the second skin processing is conducted by the second skin processing unit if the recycle mode is set.

2. The image processing apparatus according to claim 1, wherein the data outputting unit outputs any one of the corrected image data and the processed image data.

3. The image processing apparatus according to claim 1, further comprising:
    an output setting unit that makes a plurality of output settings for the image data,
    wherein when the output settings are made by the output setting unit, and when each of the output settings includes different image data format, the second skin processing is conducted by the second skin processing unit with respect to each image data setting.

4. The image processing apparatus according to claim 1, further comprising:
    a communications unit that enables data communication with an external device via a network.

5. The image processing apparatus according to claim 4, wherein when the image data is to be output to the external device, the first skin processing is conducted by the first skin processing unit.

6. The image processing apparatus according to claim 4, wherein when image data in the recycle mode is to be output to the external device, a result of skin detection obtained in the skin detecting unit is transmitted with the image data to the external device.

7. An image processing method comprising:

acquiring image data by reading a document, the image data including data of a skin part of the document, where the skin part relates to a background of the document;

detecting the skin part of the document;

conducting first skin processing to remove the data of the skin part of the document from the image data based on a result obtained at the detecting;

correcting the image data to obtain corrected image data having predetermined data characteristic;

conducting second skin processing to remove the data of the skin part of the document from the image data based on a result obtained at the detecting;

conducting image processing on the image data so as to obtain processed image data having desired characteristic;

storing any one of the corrected image data and the processed image data in a storing unit;

outputting the image data stored at the storing;

determining whether image data is to be accumulated at the storing; and setting any one of a reuse mode that permits output only in image quality set at the time of accumulation and a recycle mode that allows selection of image quality for accumulated image data when image data accumulated at the storing is re-outputted, wherein when it is determined at the determining that data is not to be accumulated, the correcting includes causing the conducting the first skin processing, wherein when it is determined at the determining that data is to be accumulated, the first skin processing is conducted at the conducting if the reuse mode is set, and the second skin processing is conducted at the conducting if the recycle mode is set.

8. The image processing method according to claim 7, further comprising:

making a plurality of output settings for the image data, wherein when the output settings are made at the making, and when each of the output settings includes different image data format, the second skin processing is conducted at the conducting with respect to each image data setting.

9. The image processing method according to claim 8, wherein when the image data is to be output to an external device, the first skin processing is conducted at the conducting.

10. The image processing method according to claim 8, wherein when image data in the recycle mode is to be output to an external device, a result of skin detection obtained at the detecting is transmitted with the image data to the external device.

11. A computer program product comprising a computer usable medium having computer readable program codes embodied in the medium that, when executed, causes a computer to execute:

acquiring image data by reading a document, the image data including data of a skin part of the document, where the skin part relates to a background of the document;

detecting the skin part of the document;

conducting first skin processing to remove the data of the skin part of the document from the image data based on a result obtained at the detecting;

correcting the image data to obtain corrected image data having predetermined data characteristic;

conducting second skin processing to remove the data of the skin part of the document from the image data based on a result obtained at the detecting;

conducting image processing on the image data so as to obtain processed image data having desired characteristic;

storing any one of the corrected image data and the processed image data; and outputting the image data stored at the storing;

determining whether image data is to be accumulated at the storing; and setting any one of a reuse mode that permits output only in image quality set at the time of accumulation and a recycle mode that allows selection of image quality for accumulated image data when image data accumulated at the storing is re-outputted, wherein when it is determined at the determining that data is not to be accumulated, the correcting includes causing the conducting the first skin processing, and wherein when it is determined at the determining that data is to be accumulated, the first skin processing is conducted at the conducting if the reuse mode is set, and the second skin processing is conducted at the conducting if the recycle mode is set.

* * * * *